United States Patent [19]

Amano

[11] Patent Number: 4,644,555
[45] Date of Patent: Feb. 17, 1987

[54] SOLID-STATE LASER DEVICE COMPRISING A FLASH LAMP USED IN OSCILLATION AND AMPLIFICATION IN COMMON

[75] Inventor: Satoru Amano, Tokyo, Japan

[73] Assignee: Hoya Corporation, Tokyo, Japan

[21] Appl. No.: 782,064

[22] Filed: Sep. 30, 1985

[30] Foreign Application Priority Data

Sep. 29, 1984 [JP] Japan ................... 59-203001

[51] Int. Cl.$^4$ ............................................. H01S 3/093
[52] U.S. Cl. ......................................... 372/72; 372/66; 372/68; 372/93
[58] Field of Search ........................ 372/93, 92, 97, 68, 372/66, 72

[56] References Cited

U.S. PATENT DOCUMENTS 4,338,578 7/1982 Sukhman ............................. 372/97
4,566,107 1/1986 Kitaura et al. ..................... 372/72
4,589,118 5/1986 Suzuki et al. ...................... 372/92

FOREIGN PATENT DOCUMENTS 3232952 3/1984 Fed. Rep. of Germany ........ 372/93

Primary Examiner—Leon Scott, Jr.
Attorney, Agent, or Firm—Frishauf, Holtz, Goodman & Woodward

[57] ABSTRACT

In a solid-state laser device comprising a laser oscillation medium and a laser amplification medium, a reflector member has an internal wall surface defining a single prismal space in which both of the oscillation and the amplification media are placed. A flash lamp is intermediate between the oscillation and the amplification media in the prismal space to activate both media in common. The oscillation and the amplification media are of a rod type and a slab-type, respectively. Preferably, the prismal space is divisible into an elliptic cylinder space having in cross section two ellipse focal points and a parabolic cylinder space having in cross section a parabola focal point common to one of the ellipse focal points. The oscillation medium is placed on another one of the ellipse focal points while the flash lamp is placed on the parabolic cylinder space and interposed between the oscillation and the amplification media. An additional oscillation medium may be placed in an additional parabolic cylinder space opposite to the parabolic cylinder space relative to the amplification medium. Alternatively, disposition of a plurality of oscillation media may be symmetrical with respect to the amplification medium in the prismal space with flash lamps interposed between the oscillation media and the amplification medium.

18 Claims, 10 Drawing Figures

4,644,555

SOLID-STATE LASER DEVICE COMPRISING A FLASH LAMP USED IN OSCILLATION AND AMPLIFICATION IN COMMON

BACKGROUND OF THE INVENTION

This invention relates to a solid-state laser device for use in welding, perforation, laser annealing, or the like.

A recent requirement for a solid-state laser device of the type described is to augment power of an output laser beam emitted from the laser device. For this purpose, a conventional solid-state laser device comprises a laser oscillator for oscillating an oscillation laser beam and a laser amplifier coupled to the laser oscillator to amplify the oscillation laser beam into the output laser beam. In each of the laser oscillator and the laser amplifier, a laser rod is optically excited or energized by flash lamp or lamps within a reflector having an elliptic cylinder space.

The conventional solid-state laser device becomes bulky in size because the laser rod of the laser amplifier should be spaced apart from that of the laser oscillator with optical axes of both laser rods matched with each other. Inasmuch as the laser rods are individually energized by the flash lamps in the laser oscillator and in the laser amplifier, the number of the flash lamps inevitably increases in the laser device. This results in a large electric power consumption.

In addition, use of the laser rod in the laser amplifier makes it difficult to augment the output laser beam. This is because a thermal distortion becomes serious and crucial and ultimately brings the laser rod to destruction when the laser amplifier has a high gain. The thermal distortion also brings about a reduction of efficiency of the laser rod.

In U.S. Pat. No. 3,633,126 by W. S. Martin et al, an elongated active laser medium is proposed which has a pair of principal surfaces parallel to each other and which is rectangular in cross section. Such a rectangular laser medium may be called a slab-type of a laser medium and may serve to lower the thermal distortion and to thereby generate an output laser beam of high power.

The laser medium of the slab-type may be laid in the laser amplifier in place of the laser rod and may optically be coupled to the laser oscillator to form a high power laser device. However, such a high power laser device inevitably becomes large in size as long as the laser oscillator is spaced apart from the laser amplifier.

SUMMARY OF THE INVENTION

It is an object of this invention to provide a solid-state laser device which can emit a laser beam of high power.

It is another object of this invention to provide a solid-state laser device of the type described, which is small in size for high power.

It is still another object of this invention to provide a solid-state laser device of the type described, which can improve a conversion efficiency between electric power and output power.

According to this invention, a solid-state laser device comprises a laser oscillation medium having a first optical axis, a laser amplification medium having a pair of principal surfaces substantially parallel to each other and to the first optical axis, an exciting lamp intermediate between the laser oscillation medium and the laser amplification medium for activating both of the laser oscillation and the laser amplification media in common, and a reflector member having a pair of ends opened and an internal wall surface surrounding the laser oscillation medium, the laser amplification medium, and the exciting lamp.

DESCRIPTION OF THE PREFERRED EMBODIMENTS

Figure 1:
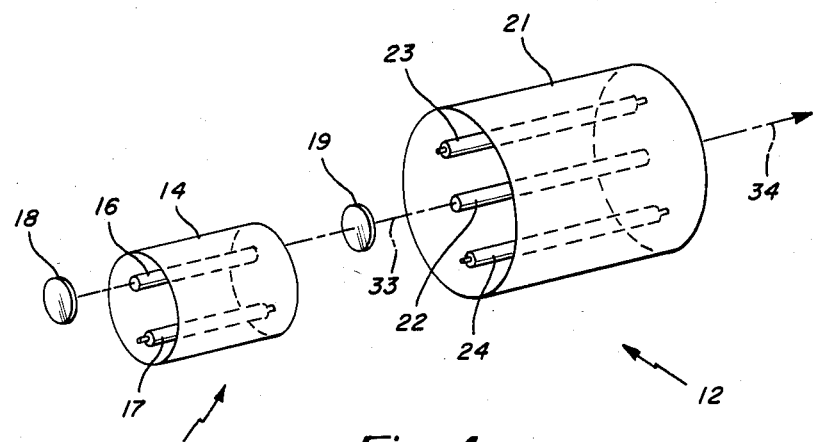
FIG. 1 is a schematic perspective view of a conventional solid-state laser device.
Figure 2:
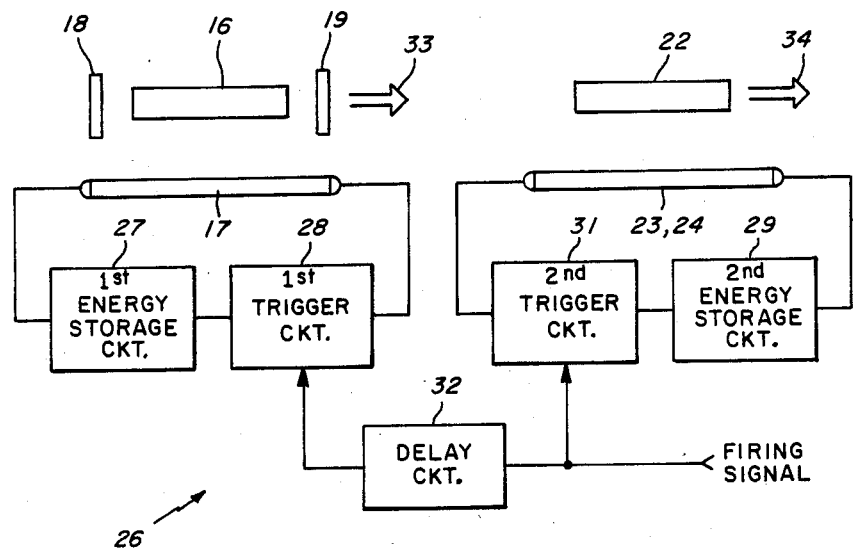
FIG. 2 is a block diagram for use in describing operation of the laser device illustrated in FIG. 1.

Referring to FIGS. 1 and 2, description will be made as regards a conventional solid-state laser device to facilitate an understanding of this invention. In FIG. 1, the solid-state laser device comprises a laser oscillator 11 and a laser amplifier 12 spaced apart from the laser oscillator 11. The laser oscillator 11 comprises a first reflector 14 having a pair of ends opened and a first internal wall surface. The first internal wall surface defines therein a first elliptic cylinder space. The first elliptic cylinder space has in cross section an elliptic configuration having a pair of focal points. Therefore, a pair of lines can be defined in the first elliptic cylinder space by continuities of the focal points and will be called first and second lines of focal points.

A first active laser medium 16 of a rod type and a first flash lamp 17 are located within the first elliptic cylinder space. The first active laser medium 16 has a first optical axis substantially coincident with the first line of focal points while the first flash lamp 17 is placed along the second line of focal points. On both sides of the first active laser medium 16, a total reflection mirror 18 and a half mirror 19 are disposed transversely of the first optical axis to form an optical resonator.

The laser amplifier 12 comprises a second reflector 21 having a pair of open ends and a second internal wall surface defining a second elliptic cylinder space therein. The second elliptic cylinder space has a center space axis and third and fourth lines of focal points determined in the manner described in conjunction with the first elliptic cylinder space. The second reflector 21 is adjusted so that the center space axis is laid on an extension of the first optical axis of the first active laser medium 16.

A second active laser medium 22 and second and third flash lamps 23 and 24 are placed within the second elliptic cylinder space and therefore surrounded by the second internal wall surface of the second reflector 21. More specifically, the second active laser medium 22 has a second optical axis substantially extended on the center space axis while the flash lamps 23 and 24 are substantially disposed on the third and fourth lines of focal points, respectively.

In FIG. 2, a lamp drive circuit 26 is coupled to the first through third flash lamps 17, 23, and 24 in the ilustrated manner, although the second and third flash lamps 23 and 24 is specified by a single flash lamp in FIG. 2. Specifically, a series circuit of a first energy storage circuit 27 and a first trigger circuit 28 is connected across the first flash lamp 17 while a series circuit of a second energy storage circuit 29 and a second trigger circuit 31 is connected across both of the second and third flash lamps 23 and 24.

A firing signal is delivered from a known circuit (not shown) to the first trigger circuit 28 through a delay circuit 32 and direct to the second trigger circuit 31. Supplied with the firing signal, the first through third flash lamps 17, 23, and 24 are fired in the known manner to illuminate and activate the first and second active laser media 16 and 22. As a result, the first active laser medium 16 oscillates an oscillation laser beam 33 along the first optical axis with the help of the optical resonator (18 and 19). The oscillator laser beam 33 is subjected to amplification by the second active laser medium 22 and produced as an output laser beam 34.

Since the laser oscillator 11 and the laser amplifier 12 are spaced from each other as shown in FIG. 1, the illustrated device has a disadvantage as pointed out in the preamble of the instant specification.

When the laser rod is used as the second active laser medium 22 of the laser amplifier 12, power of the output laser beam 34 must be restricted to some extent. More particularly, a thermal gradient takes place between an outer surface of the laser rod and the second optical axis thereof when the laser rod is excited by the lamps 23 and 24. Consequently, a temperature difference occurs between the outer surface and the second optical axis and gives rise to a thermal distortion. Such a thermal distortion brings the laser rod to destruction, as mentioned before.

Figure 3:
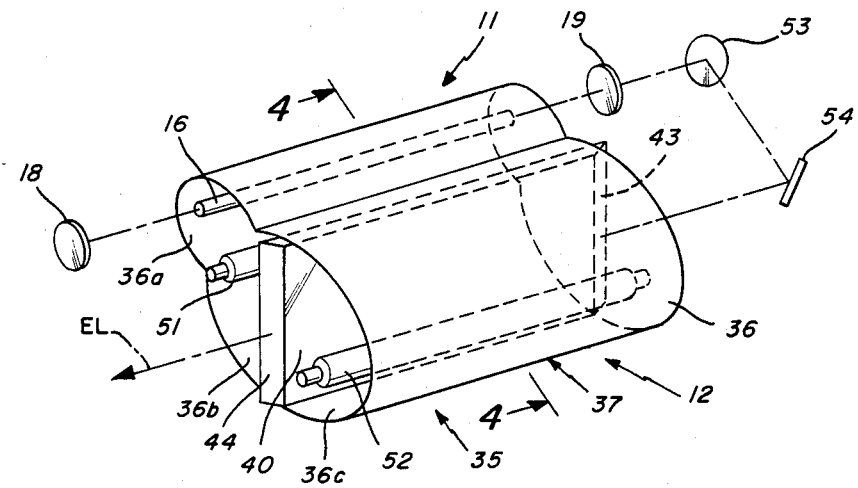
FIG. 3 is a schematic perspective view of a solid-state laser device according to a first embodiment of this invention.
Figure 4:
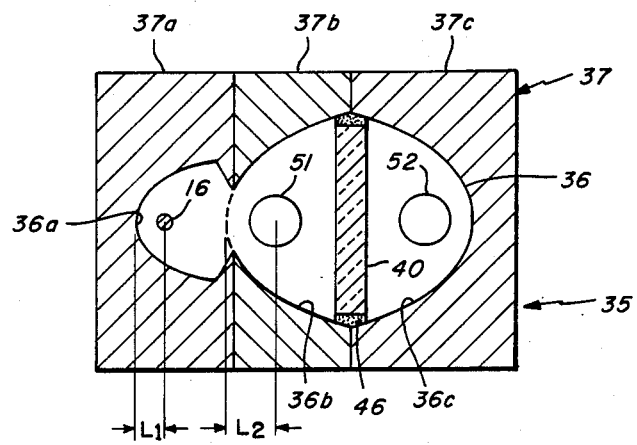
FIG. 4 is a cross sectional view of the solid-state laser device illustrated in FIG. 3.
Figure 5:
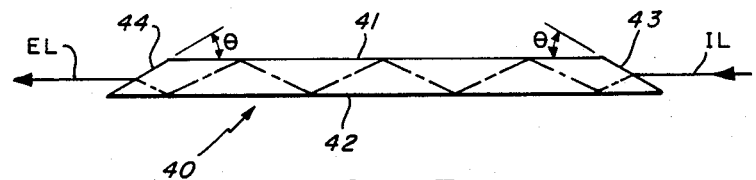
FIG. 5 is a side view for use in describing a slab-type medium for use in the solid-state laser device illustrated in FIGS. 4 and 5.

Referring to FIGS. 3 through 5, a solid-state laser device according to a first embodiment of this invention comprises a laser oscillator 11 and a laser amplifier 12 integral with the laser oscillator 11 in a manner to be described later in detail. In FIGS. 3 and 4, the illustrated solid-state laser device comprises a reflector member 35 having a pair of open ends and an internal wall surface 36. Although the reflector member 35 is specified by the internal wall surface 36 alone, the reflector member 35 comprises a reflector block 37 of, for example, stainless steel as shown in FIG. 4 and the internal wall surface 36 is defined inside of the reflector block 37. Anyway, the internal wall surface 36 serves as a reflecting surface and is formed by a plated layer of gold. The internal wall surface surrounds a prismal space or cavity.

As shown in FIG. 4, the reflector block 37 comprises first, second, and third partial blocks 37a, 37b, and 37c arranged from lefthand side to righthand side of FIG. 4 and combined together. The first partial block 37a has a first partial surface 36a which is a part of the internal wall surface 36 and which defines a part of an elliptic cylinder space therein. The part of the elliptic cylinder space is extended between both of the open ends of the reflector member 35 and is of a partial ellipse in cross section, as best shown in FIG. 4. The partial ellipse has a real focal point in the elliptic cylinder space and an imaginary focal point outside of the elliptic cylinder space and is represented by:

$$(x^2/25)+(y^2/20)=1.$$

Therefore, the elliptic cylinder space has a first line of the real focal point and a second line of the imaginary focal point. For example, a distance $L_1$ between the real focal point and the first partial surface 36a is equal to 7 mm when measured along the major axis of the partial ellipse.

The second partial block 37b is brought into contact with the first partial block 37a and has a second partial surface 36b which is a part of the internal wall surface 36. The second partial surface 36b defines therein a first parabolic cylinder space having a line of a parabola focal point, a line of a vertex point, and an aperture plane opposite to the line of the vertex point. The aperture plane is formed along a righthand side end of the second partial block 37b. The first parabolic cylinder space provides in cross section a parabolic configuration given by:

$$y^2=40x.$$

The first parabolic cylinder space is partly opened in the vicinity of the line of the vertex point so as to be merged into the elliptic cylinder space.

In FIG. 4, an imaginary plane of the first parabolic cylinder space is shown by a dotted line between the first parabolic cylinder space and the elliptic cylinder space.

In addition, the second line of the imaginary focal point of the elliptic cylinder space is substantially coincident with the line of the parabola focal point.

The third partial block 37c is brought into contact with the second partial block 37b on the righthand side of the second partial block 37b and has a third partial surface 36c which is a part of the internal wall surface 36. The third partial surface 36c defines therein a second parabolic cylinder space having in cross section a parabolic configuration similar to that of the first parabolic cylinder space. Therefore, the second parabolic cylinder space has a line of an additional focal point, a line of an additional vertex point, and an additional aperture plane. The additional aperture plane is directed to the first parabolic cylinder space and is coplanar with the aperture plane of the first parabolic cylinder space to form a coplanar plane. In this connection, the line of the additional vertex point is positioned away from the second partial block 37b, as readily understood from FIG. 4.

For example, each distance $L_2$ between the vertex point and the parabola focal point and between the additional vertex point and the additional vertex point is equal to 10 mm. At any rate, the first through third partial blocks 37a to 37c are united into the reflector block 37 by the use of pins (not shown).

In FIGS. 3 and 4, the illustrated laser oscillator 11 comprises an active laser medium of a rod type depicted at 16 like in FIGS. 1 and 2. The active laser medium 16 may be called a laser beam oscillation medium. The active laser medium 16 may be, for example, LHG-8 manufactured and sold by HOYA Corporation, Tokyo, and has a diameter of 3 mm and a length of 75 mm. Both ends of the active laser medium 16 has optical flatness as a result of polishing. Therefore, each end has profile irregularity which does not exceed $\lambda/10$, where $\lambda$ is equal to 632.8 nm.

The active laser medium 16 is surrounded by the reflector block 37. More specifically, the active laser medium 16 has an optical axis substantially placed on the first line of the real focal point of the elliptic cylinder space. In other words, the optical axis of the active laser medium 16 is coincident with the first line of the real focal point.

Like in FIGS. 1 and 2, a total reflection mirror 18 and a half mirror 19 are positioned on both sides of the active laser medium 16 transversely of the optical axis of the active laser medium 16. The total reflection mirror 18 may approximately completely reflect a light beam having a wavelength of 1.052 micron meters while the half mirror 19 may reflect the light beam of the same wavelength by about 60%.

The laser amplifier 12 comprises a laser beam amplification medium 40 of a slab-type which may be referred to as a slab-type medium 40. The slab-type medium may be, for example, LHG-8, like the active laser medium 16 and may be 100 mm long, 30 mm wide, and 6 mm thick.

Temporarily referring to FIG. 5, the slab-type medium 40 has a first principal surface 41 directed upwards of FIG. 5, a second principal surface 42 directed downwards thereof, and a pair of oblique end surfaces 43 and 44. A righthand one 43 of the end surfaces serves as an incident surface and the other one 44 thereof serves as an exit surface, as will become clear later. The incident surface 43 is inclined towards the exit surface 44 at an angle $\theta$ of 30° and the exit surface 44 is inclined towards the incident surface 43 at the same angle. Therefore, the slab-type medium 40 has a trapezoidal configuration in section, as shown in FIG. 5. In addition, a pair of side surfaces are placed in a direction of a width of the slab-type medium 40 and contiguous to the principal surfaces and the incident and exit surfaces.

Referring back to FIGS. 3 and 4, the slab-type medium 40 is placed on the coplanar plane formed by the aperture and the additional aperture planes of the second and the third partial blocks 37b and 37c. The slab-type medium 40 is fixed to the second and the third partial blocks 37b and 37c in substantial parallel to the active laser medium 16 and the lines of both of the parabola focal point and the additional parabola focal point. To this end, a solder 46 of glass is filled within gaps left between the internal wall surface 36 of the reflection block 37 and the side surfaces of the slab-type medium 40.

Furthermore, a first flash lamp 51 is positioned on the line of the parabola focal point coincident with the second line of the imaginary focal point of the elliptic cylinder space. Likewise, a second flash lamp 52 is positioned on the line of the additional parabola focal point of the second parabolic cylinder space. Each of the first and the second flash lamps 51 and 52 may be, for example, 10F4 manufactured by ILC.

In FIG. 3, the slab-type medium 40 is optically coupled to the active laser medium 18 through the half mirror 19 and mirrors 53 and 54 intermediate between the half mirror 19 and the slab-type medium 40. The mirrors 53 and 54 may totally reflect the light beam of the wavelength having 1.052 micron meters. Thus, the mirrors 53 and 54 may be called an optical coupling member for optically coupling the active laser medium 16 and the slab-type medium 40.

In this structure, let the first and second flash lamps 51 and 52 be lit or fired in a known manner to produce excitation light. The excitation light converges to the active laser medium 16 and the slab-type medium 40 to put the same into active states. In this event, the first flash lamp 51 is operable to pump both of the active laser medium 16 and the slab-type medium 40 in common because the first flash lamp 51 is intermediate between the active laser medium 16 and the slab-type medium 40. Inasmuch as the first flash lamp 51 is positioned on the first line of the focal point which is common to the line of the parabola focal point, as mentioned before, both of the active laser medium 16 and the slab-type medium 40 are favorably activated by the first flash lamp 51. In the example being illustrated, the first flash lamp 51 illuminates the second principal surface 42 of the slab-type medium 40 while the second flash lamp 52 illuminates the first principal surface 41 of the slab-type medium 40.

Pumped by the first flash lamp 51, the active laser medium 16 cause laser oscillation to occur with the help of the resonator formed by the total reflection mirror 18 and the half mirror 19 and produces an oscillation laser beam having a wavelength of 1.052 micron meters through the half mirror 19. The oscillation laser beam is incident as an incident light beam IL onto the incident surface 43 of the slab-type medium 40 through the optical coupling member, such as the mirrors 53, 54.

As illustrated in FIG. 5, the incident light beam IL is totally and alternatingly reflected on the second and first principal surfaces 42 and 41 seven times. In consequence, the incident light beam IL travels along a zigzag optical path in the slab-type medium 40, as illustrated in FIG. 5, and exits as an exit or output light beam EL from the exit surface 44.

The incident light beam IL is amplified into the output light beam EL by the slab-type medium 40 excited by both the first and second flash lamps 51 and 52, during traveling of the incident light beam IL. Such a slab-type medium 40 can remove heat generated therein by causing a suitable fluid heat exchange medium (not shown) to flow along the first and second principal surfaces 41 and 42 of the slab-type medium 40, as known in the art. As a result, thermal distortion can be reduced in the slab-type medium 40 and phase distortion of the output light beam EL can also be reduced.

As illustrated in FIGS. 3 and 4, the solid-state laser device comprises the laser oscillator 11 united with the laser amplifier 12 and is therefore compact in size in comparison with the conventional laser device described with reference to FIGS. 1 and 2. The first flash lamp 51 is common to the active laser medium 16 and the slab-type medium 40 and is positioned on the common line of the imaginary focal point of the elliptic cylinder space and the parabola focal point of the parabolic cylinder space. It is therefore possible to improve a conversion efficiency between electric power given to the first flash lamp 51 and output power of the exit light beam EL and to reduce the number of the flash lamps, such as 51 and 52. Consequently, power consumption is reduced in the illustrated solid-state laser device. The resultant laser device becomes cheap as compared with the conventional laser device.

Figure 6:
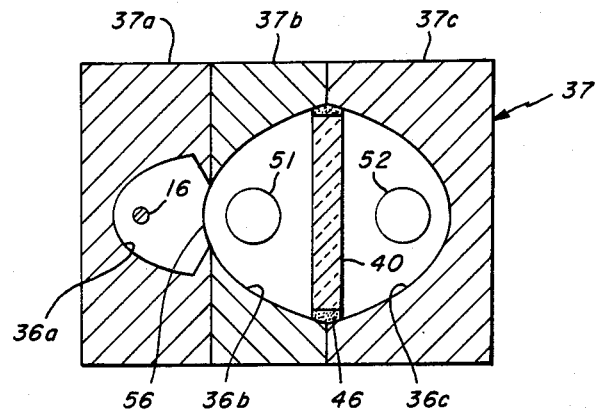
FIG. 6 is a cross sectional view of a solid-state laser device according to a second embodiment of this invention.

Referring to FIG. 6, a solid-state laser device according to a second embodiment of this invention is similar to that illustrated in FIGS. 3 and 4 except that a filter 56 is placed at a boundary between the elliptic cylinder space of the first partial block 37a and the parabolic cylinder space of the second partial block 37b in the vicinity of the vertex of the parabolic cylinder space. Although the illustrated filter 56 is disposed along the imaginary plane of the parabolic cylinder space, it may not always be placed along the imaginary plane.

The filter 56 serves to select the excitation light of the first flash lamp 51 and to excite the active laser medium 16 by selected one of the excitation light. In other words, superfluous light component of the excitation light is removed by the filter 56. Thus, the illustrated active laser medium 16 can be effectively excited by adjusting intensity of the excitation light to an optimum value. The filter 56 may have a power cutoff wavelength of, for example, 500 nm and serves to cut a wavelength shorter than 500 nm.

Figure 7:
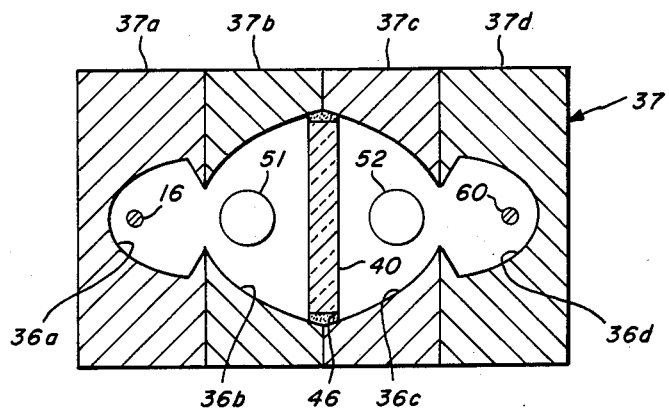
FIG. 7 is a cross sectional view of a solid-state laser device according to a third embodiment of this invention.

Referring to FIG. 7, a solid-state laser device according to a third embodiment of this invention comprises similar parts designated by like reference numerals. In FIG. 7, the illustrated reflector block 37 comprises a third partial block 37c and a fourth partial block 37d attached to the righthand side of the third partial block 37c. The third partial block 37c has a third partial surface 36c defining an additional parabolic cylinder space partially merged into the fourth partial block 37d, like the second partial block 37b.

The fourth partial block 37d has a fourth partial surface 36d which is a part of the internal wall surface 36 and which partially defines an additional elliptic cylinder space therein. The additional elliptic cylinder space is associated with the additional parabolic cylinder space of the third partial block 37c and has a third line of a real focal point and a fourth line of an imaginary focal point substantially coincident with the additional parabolic focal point of the third partial block 37c.

Thus, the additional parabolic cylinder space of the third partial block 37c is partly opened in the vicinity of the line of the additional vertex point so as to be associated with the additional elliptic cylinder space of the fourth partial block 37d.

In the example being illustrated, the third and the second partial blocks 37c and 37b are substantially symmetrical with respect to the slab-type medium 40. Likewise, the fourth and the first partial blocks 37d and 37a are substantially symmetrical with respect to the slab-type medium 40. In this connection, a combination of the parabolic cylinder space and the additional parabolic cylinder space may be called a center space while the elliptic cylinder space and the additional elliptic cylinder space may be called side spaces. A cavity or prismal space defined by the first through fourth partial blocks 37a to 37d has a prismal space axis passing through the slab-type medium 40.

As readily understood from the above, the second flash lamp 52 is positioned on the line of the additional parabolic focal point which is common to the fourth line of the imaginary focal point of the additional elliptic cylinder space. An additional active laser medium 60 is disposed on the third line of the real focal point of the additional elliptic cylinder space and may be similar to the active laser medium 16.

With this structure, the second flash lamp 52 can effectively excite both of the slab-type medium 40 and the additional active laser medium 60 like the first flash lamp 51.

As a result of excitation, the additional active laser medium 60 oscillates an additional oscillated laser beam in cooperation with another resonator (not shown) similar to the resonator (18, 19) illustrated in FIG. 3. The additional oscillated laser beam is incident as an additional incident light beam to the incident surface 43 (FIG. 5) through another optical coupling member (not shown).

The additional incident light beam may have either the same optical axis as the incident light beam IL or an optical axis displaced from that of the incident light beam IL. Displacement of the optical axes between two incident light beams results in two different exit light beams which are subjected to amplification by the slab-type medium 40. It is possible to render the two different exit light beams into a single light beam by the use of a cylinderical lens (not shown).

When a single exit light beam is produced from the solid-state laser device illustrated in FIG. 7 either by making the optical axis of the additional incident light beam coincide with that of the incident light beam IL or by using the cylindrical lens, the single exit light beam has high energy. On the other hand, when two exit light beams are individually produced from the illustrated laser device applied to a laser beam machine, two different portions can concurrently be wrought on an object to be processed by the laser device.

Figure 8:
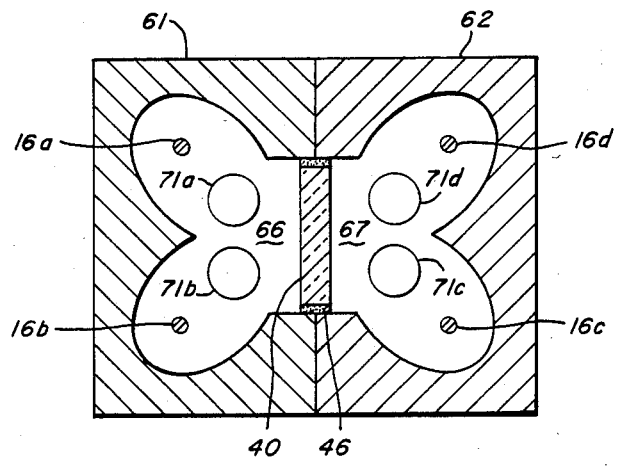
FIG. 8 is a cross sectional view of a solid-state laser device according to a fourth embodiment of this invention.

Referring to FIG. 8, a solid-state laser device according to a fourth embodiment of this invention comprises a reflector member divided into first and second blocks 61 and 62. The first and second blocks 61 and 62 have first and second partial surfaces which form an internal wall surface together. The internal wall surface defines a cavity or prismal space divisible into a center space and a pair of side spaces laid on both sides of the center space. The prismal space is also divisible by the first and second blocks 61 and 62 into first and second partial spaces 66 and 67 symmetrical with respect to a center plane on which the first and second blocks 61 and 62 are brought into contact with each other. The center plane defines a prismal center axis thereon.

Like in FIG. 7, a slab-type medium 40 is placed along the center plane and fixed to the internal wall surface by a solder 46.

Each of the first and the second blocks 61 and 62 partially shares the center space and defines one of the side spaces. Each side space 66 and 67 has a pair of partially elliptic cylinder spaces each of which is contiguous to the center space and which has first and second lines of focal points spaced away from and adjacent to the center space, respectively.

First through fourth active laser media 16a to 16d of rod types are placed on the first lines of the focal points of the respective elliptic cylinder spaces. First through fourth flash lamps 71a to 71d are positioned on the second lines of the focal points of the respective elliptic cylinder spaces.

With this structure, each of the first through fourth flash lamps 71a to 71d illuminates a corresponding one of the active laser media 16a to 16d and the slab-type medium 40 in common. The slab-type medium 40 is therefore excited by four of the flash lamps 71a to 71d and can sufficiently amplify incident light beams, although the flash lamps 71a to 71d are not placed on parabola focal points as illustrated in FIG. 7.

The first through fourth active laser media 16a to 16d oscillate first through fourth oscillation laser beams in cooperation with resonators in the manner described in conjunction with FIG. 3. The first through fourth oscillation laser beams are incident on the incident surface 43 as the incident light beams through optical coupling members, such as the mirrors 53 and 54 (FIG. 3). Each of the incident light beams may have either the same optical axes as the others or an optical axis different from the others, as mentioned in conjunction with FIG. 7.

Figure 9:
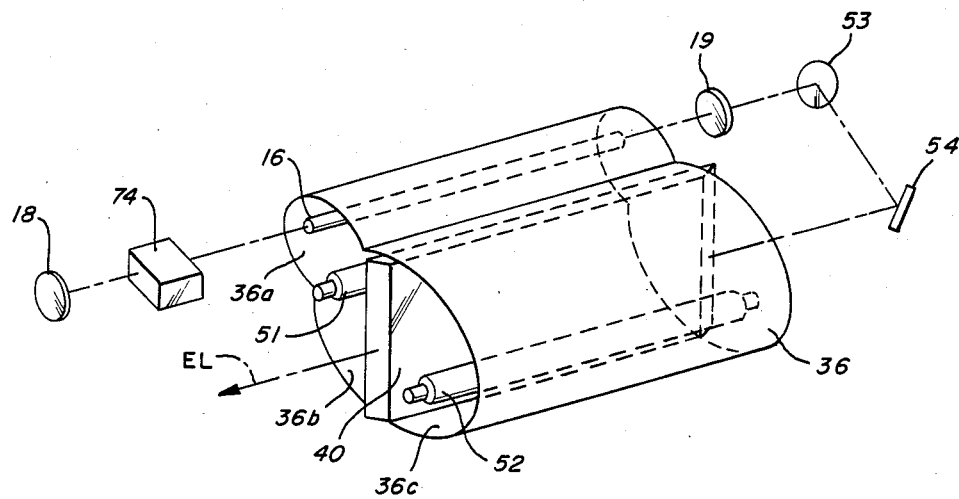
FIG. 9 is a schematic perspective view of a modification of the first embodiment illustrated in FIGS. 3 and 4.

Referring to FIG. 9, a solid-state laser device according to a modification of the first embodiment is similar to that illustrated in FIG. 3 except that an acoustooptic element 74 is disposed as a Q-switch between the total reflection mirror 18 and the active laser medium 16. The illustrated laser device serves as a Q-switched laser for oscillating a giant pulse.

Figure 10:
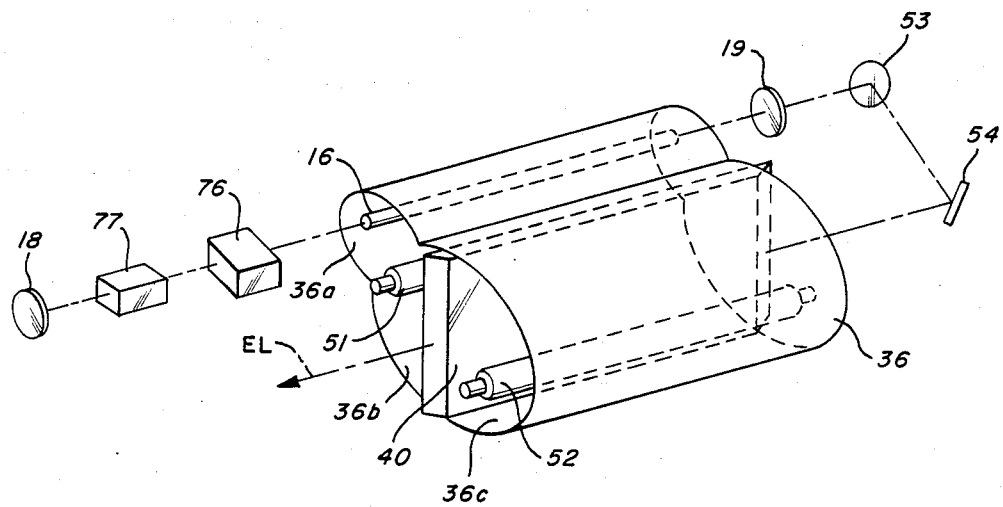
FIG. 10 is a schematic perspective view of another modification of the first embodiment illustrated in FIGS. 3 and 4.

Referring to FIG. 10, a solid-state laser device according to another modification of the first embodiment comprises, as a Q-switch, a combination of a polarizer 76 and an electro-optic element 77 which is placed between the total reflection mirror 18 and the active laser medium 16.

Thus, each of the laser devices illustrated in FIGS. 9 and 10 can cooperate with the active laser medium 16 of the rod type to form the Q-switched laser.

Anyway, it is possible to raise power of the laser device by the use of the slab-type medium 40 and to reduce the number of the flash lamps by using at least one of the flash lamps in common to oscillation and amplification. Thus, the laser device becomes small in size. No delay circuit becomes necessary to fire each flash lamp.

While this invention has thus far been described in conjunction with several embodiments thereof, it will readily be possible for those skilled in the art to put this invention into practice in various other manners. For example, the active laser medium or the slab-type medium, such as 16, 60, 16a to 16d, 40, may be, for example, Nd:YAG, a silicate glass layer, Nd:YLF, or the like. The slab-type medium may be of a parallelepiped in section. The flash lamps 51 and 52 as illustrated in FIGS. 3 and 4 may be located within an elliptic cylinder space. The half mirror 19 may have a reflection factor of about 30%.

What is claimed is:

1. A solid-state laser device comprising:
   a rod-type laser oscillation medium having a first optical axis;
   a slab-type laser amplification medium having a pair of principal surfaces substantially parallel to each other and to said first optical axis;
   an exciting lamp intermediate between said laser oscillation medium and said laser amplification medium for activating both of said laser oscillation and said laser amplification media in common; and
   a reflector member having a pair of ends opened and an internal wall surface surrounding said laser oscillation medium, said laser amplification medium, and said exciting lamp.

2. A solid-state laser device as claimed in claim 1, wherein said internal wall surface comprises:
   a first partial surface for surrounding said laser oscillation medium;
   a second partial surface contiguous to said first partial surface and surrounding said laser amplification medium.

3. A solid-state laser device as claimed in claim 2, wherein said first partial surface defines therein a part of an elliptic cylinder space having a first line of a real focal point and a second line of an imaginary focal point while said second partial surface defines therein a parabolic cylinder space which has a line of a parabola focal point, a line of a vertex point, and an aperture plane opposite to said line of the vertex point, said parabolic cylinder space being partially merged into said elliptic cylinder space in the vicinity of said line of vertex point.

4. A solid-state device as claimed in claim 3, wherein said reflector member further comprises:
   a filter member located along a boundary between said elliptic cylinder space and said parabolic cylinder space.

5. A solid-state laser device as claimed in claim 3, wherein said internal wall surface further has a third partial surface therein an additional parabolic cylinder space which has an additional line of a parabola focal point, an additional line of a vertex point, and an additional aperture plane opposite to said additional line of the vertex point and brought into contact with said aperture plane to form a border plane therebetween.

6. A solid-state laser device as claimed in claim 5, further comprising:
   an additional exciting lamp in said additional parabolic cylinder space.

7. A solid-state laser device as claimed in claim 6, wherein said first optical axis of the laser oscillation medium is substantially coincident with said first line of the real focal line while said exciting lamp and said additional exciting lamp are substantially placed on said line of the parabola focal line and said additional line of the parabola focal point, respectively.

8. A solid-state laser device as claimed in claim 7, wherein said second line of the imaginary focal point is substantially coincident with said line of the parabola focal point.

9. A solid-state laser device as claimed in claim 3, wherein said internal wall surface further comprises:
   a third partial surface contiguous to said second partial surface for defining an additional parabolic cylinder space substantially symmetrical with respect to said laser amplification medium with said parabolic cylinder space defined by said second partial surface; and
   a fourth partial surface contiguous to said third partial surface for defining an additional elliptic cylinder space substantially symmetrical with respect to said laser amplification medium with said elliptic cylinder space defined by said first partial space.

10. A solid-state laser device as claimed in claim 9, further comprising:
    an additional exciting lamp in said additional parabolic cylinder space; and
    a subsidiary exciting lamp in said additional elliptic cylinder space.

11. A solid-state laser device as claimed in claim 3, wherein said first optical axis of the laser oscillation medium is substantially coincident with said first line of the real focal point while said exciting lamp is substantially placed on said line of the parabola focal point.

12. A solid-state laser device as claimed in claim 11, wherein said second line of the imaginary focal point is substantially coincident with said line of the parabola focal point.

13. A solid-state laser device as claimed in claim 11, wherein said laser amplification medium is substantially placed on said aperture plane.

14. A solid-state laser device as claimed in claim 1, further comprising:

means for optically coupling said laser beam activating medium to said laser beam amplifying medium.

15. A solid-state laser device as claimed in claim 1, wherein said laser oscillation medium is optically coupled to a Q-switch.

16. A solid-state laser device comprising:
a reflector member having an internal wall surface which defines a prismal space around a prismal space axis, said prismal space being divisible into a center space and a pair of side spaces contiguous to said center space on both sides of said center space;
a laser amplification medium of a slab-type which has a pair of principal surfaces opposite to each other and which is placed along said prismal space axis in said center space with said principal surfaces directed to face said side spaces;
a plurality of rod-type laser beam media disposed in said side space symmetrically with respect to said slab-type laser amplification medium; and
a plurality of exciting lamps intermediate between each principal surface of said laser amplification medium and said laser oscillation media of each of said side spaces.

17. A solid-state laser device as claimed in claim 16, wherein each of said side spaces has a pair of partial elliptic prismal spaces each of which is contiguous to said center space and has first and second lines of focal points far from and adjacent to each of said principal surfaces, respectively.

18. A solid-state laser device as claimed in claim 17, wherein said plurality of the laser oscillation media are positioned on the respective first lines of the focal points while said plurality of the exciting lamps are positioned at the respective second lines of the focal points.

* * * * *